United States Patent [19]

Jahnke, Jr.

[11] Patent Number: 4,848,409

[45] Date of Patent: Jul. 18, 1989

[54] COUPLING GUARD

[75] Inventor: William H. Jahnke, Jr., Cuba, N.Y.

[73] Assignee: Dresser-Rand Company, Corning, N.Y.

[21] Appl. No.: 166,634

[22] Filed: Mar. 11, 1988

[51] Int. Cl.$^4$ .............................................. F16L 57/00
[52] U.S. Cl. ..................................... 138/110; 138/103; 138/157; 138/158; 138/164; 464/170; 285/45
[58] Field of Search ............... 138/103, 128, 151, 156, 138/157, 158, 162, 163, 164, 165, 166, 167, 168, 110; 464/170; 285/45, 46; 137/377, 381

[56] References Cited

U.S. PATENT DOCUMENTS

| | | |
|---|---|---|
| 178,694 | 6/1876 | Wilcox . |
| 409,196 | 8/1889 | Hart .................................... 138/163 |
| 600,375 | 3/1898 | Podeyn . |
| 710,721 | 10/1902 | Sindelar .............................. 138/99 |
| 901,534 | 10/1908 | Hamlin ............................... 138/164 |
| 1,012,909 | 12/1911 | Podeyn . |
| 1,129,615 | 2/1915 | Sykes .................................. 138/99 |
| 1,153,467 | 9/1915 | Tynan . |
| 1,199,496 | 9/1916 | Probert . |
| 1,708,994 | 4/1929 | Wylie .................................. 138/157 |
| 1,948,232 | 2/1934 | Hall . |
| 3,126,444 | 3/1964 | Taylor ................................. 138/163 |
| 3,425,456 | 2/1969 | Schibig . |
| 3,443,601 | 5/1969 | Siegwart .............................. 138/156 |
| 4,128,160 | 12/1978 | Deal et al. . |
| 4,236,949 | 12/1980 | Horsma et al. ...................... 138/99 |

FOREIGN PATENT DOCUMENTS

| | | | |
|---|---|---|---|
| 503979 | 6/1951 | Belgium ............................. 138/163 |
| 8014 | 7/1899 | Norway ............................. 464/170 |
| 4441 | of 1909 | United Kingdom ............... 138/163 |
| 308063 | 3/1929 | United Kingdom ............... 464/170 |
| 2075086 | 11/1981 | United Kingdom ............... 138/128 |

*Primary Examiner*—James E. Bryant, III

[57] ABSTRACT

An improved coupling guard for enclosing rotating couplings, shafts and other devices with the improvement comprising an interlocking closure consisting of a retainer element, a retained element and a resilient gasket substantially between the retainer and the retained elements. The improved coupling guard provides a substantially leakproof enclosure that is easily assembled and disassembled. In a preferred embodiment of the invention, the guard comprises two or more semi-cylindrical shell portions that cooperate to form a substantially cylindrical enclosure and that are joined by use of the interlocking closures. In the closures, the gasket is adapted to both seal the closure against leakage and to resiliently bias the retained element into retaining engagement with the retainer element.

15 Claims, 1 Drawing Sheet

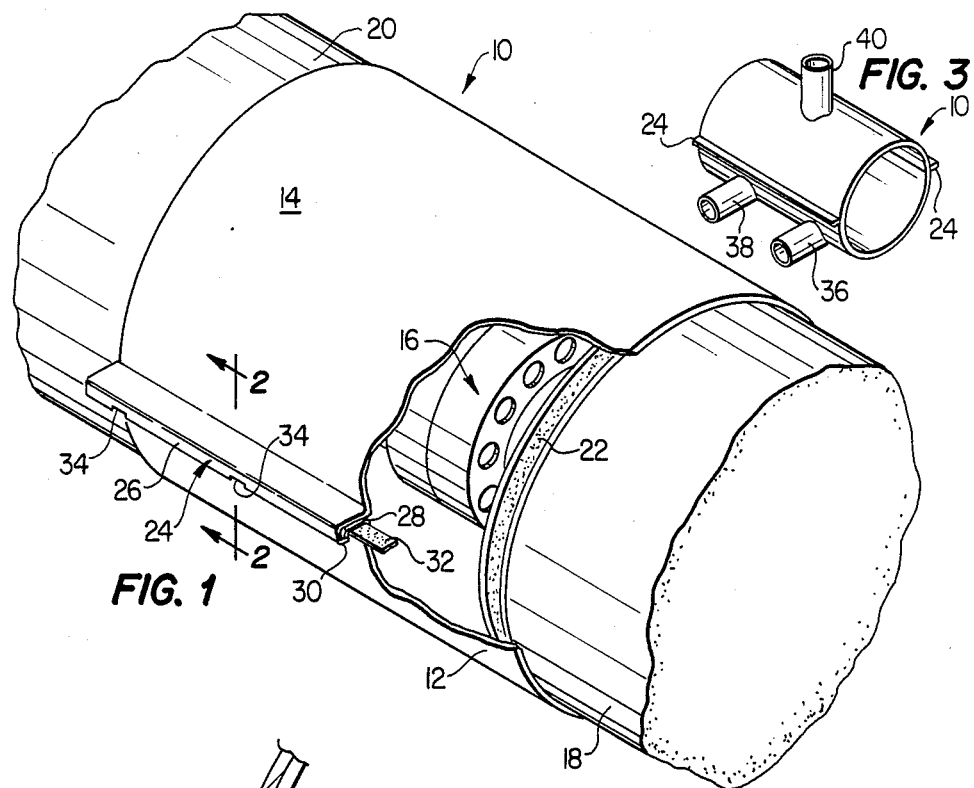
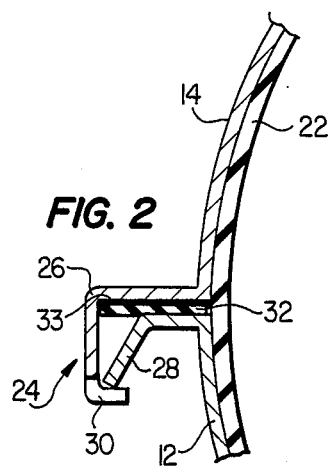
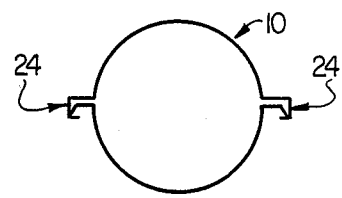
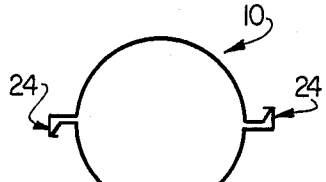
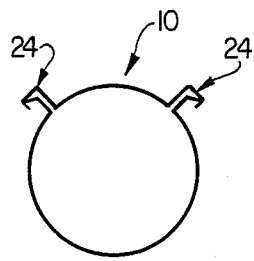
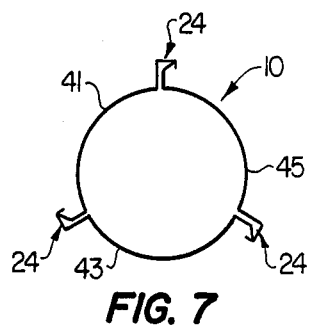

COUPLING GUARD

TECHNICAL FIELD

This invention relates to an improved coupling guard for enclosing rotating couplings, shafts and other mechanical devices. In a preferred embodiment, the invention includes two or more semi-cylindrical shell portions that cooperate to form a substantially cylindrical coupling guard, and the shell portions having cooperating closures comprising a retainer element, a retained element, and a resilient gasket substantially between the retainer and the retained elements. The gasket provides a substantially leakproof seal along the closure element, and it resiliently biases the retained element into retaining engagement with the retainer element.

BACKGROUND OF THE INVENTION

The present invention provides an improved coupling guard for enclosing a rotating shaft or other device to prevent access during operation and to prevent leakage of lubricant during operation. The coupling guard is easy to assemble and disassemble, and it eliminates the need for bolts, wrenches and specially sized O-ring seals in assembling the guard.

Various devices are known for covering or protecting a rotating shaft or coupling. Some examples are disclosed in U.S. Pat. Nos. 1,153,467; 1,012,909; and 600,375. These references disclose a cylindrical covering formed from one or two cylindrical shell portions with the portions being fastened together by using screws, bolts or rivets. Such fastening devices make it difficult and cumbersome to remove the cover for service to the coupling. It is desirable to have a coupling guard that may be easily and quickly assembled and disassembled to allow for convenient and easy access to the coupling for maintenance and inspection. It is further desirable to have a coupling guard that is capable of wholly enclosing the coupling, rotating shaft or other moving mechanical device in order to prevent access during operation and to provide for the safety of those working nearby. It is also desirable to have a coupling guard that is substantially leakproof so that oils may be used to lubricate the coupling or rotating shafts while in use without a concern for leaking oil.

Various fittings, flanges, latches and joints for joining cylindrical portions are known in the art. Representative examples are shown in U.S. Pat. Nos. 136,755; 1,199,496; 1,948,232; 3,425,456; and 4,128,160. In U.S. Pat. No. 4,128,160, Deal et al. disclose a leak free housing for encasing a vertical screw conveyor comprising two C-shaped cylindrical half portions assembled by means of a novel joint structure. The joint consists of hook-like flanges that seal as one flange fits inside the other. A clamp is provided to maintain a tight seal between the two portions. The disclosure states that gaskets are unworkable because the device is intended to be used with foodstuffs.

As known in the art, various types of rivets and bolts are commonly used to fasten cylindrical portions together in forming coupling guards. These rivets or bolts must be "popped" or undone in order to gain access to the coupling or shaft inside the guard and must be replaced in reassembling the guard. In addition, the prior art devices typically utilize specially sized O-ring seals in order to seal the guard against leakage. None of the devices known in the art, however, are capable of providing a leakproof enclosure that is readily assembled and disassembled without the use of rivets or bolts. The present invention provides such a coupling guard and includes a coupling mechanism that differs from the prior art in its unique configuration and the use of a resilient seal.

SUMMARY OF THE INVENTION

The present invention provides a coupling guard for enclosing rotating couplings, shafts and other mechanical devices within a substantially cylindrical guard. The coupling guard is substantially leakproof and is more easily assembled and disassembled than previously known devices. The invention allows for quick access to the coupling for maintenance, repairs or inspection.

The invention provides an improved coupling guard comprising an interlocking closure consisting of a retainer element, a retained element and a resilient gasket positioned substantially between the retainer element and the retained element. The gasket is adapted to both seal the guard at the closure point and to resiliently bias the retained element into retaining engagement with the retainer element.

In a preferred embodiment, the retained element is a bent flange that engages within the retainer element which is a hook or J-shaped channel. These elements may be attached to or integrally formed in corresponding semi-cylindrical shell portions that cooperate to form a substantially cylindrical enclosure. The closure runs substantially the length of the coupling guard and is attached to the exterior surface of the guard. In a preferred embodiment, the J-shaped channel has notches or cutaways to aid in assembly and disassembly. The closure elements provide a leakproof seal along the length of the guard. The guard may be attached to an adapter piece or another device at either end, and the guard may also include resilient gasket material used to seal off the end connections.

BRIEF DESCRIPTION OF THE FIGURES

The foregoing and additional objects and advantages of the invention will be more apparent when the following Detailed Description is read in conjunction with the accompany Figures and Drawings, wherein like reference characters denote like parts in all views and wherein:

FIG. 1 is a perspective view with a partial cutaway showing the interior of the coupling guard of the present invention;

FIG. 2 is a close-up cross-sectional view of the closure element;

FIG. 3 is a perspective view of the coupling guard showing input and output lines from the interior of the guard;

FIGS. 4, 5, and 6 show alternative configurations for arrangement of the closure elements on the guard as disclosed by the present invention; and FIG. 7 shows an embodiment of the invention using more than two semi-cylindrical shell portions to form the substantially cylindrical coupling guard.

DETAILED DESCRIPTION

The present invention provides an improved coupling guard for enclosing rotating couplings, shafts, and other mechanical devices to prevent access during operation and to prevent leakage of lubricants. It allows for convenient and quick access to the coupling during maintenance and inspection. The present invention considerably reduces the manufacturing cost while improving the product usability and reliability.

The invention includes a closure for joining together associated edges of shell portions that form a coupling guard. The closure provides a substantially leakproof seal and is easily assembled and disassembled. The closure comprises a retainer element, a retained element, and a resilient gasket intermediate the retainer element and the retained element. The gasket is adapted to substantially seal the guard and resiliently bias the retained element into retaining engagement with the retainer element. A preferred embodiment of these elements is shown in FIGS. 1 and 2. FIG. 1 shows a cutaway perspective view of a preferred coupling guard 10. Semicylindrical shell portions 12 and 14 cooperate to form guard 10 that encloses coupling 16. The guard 10 may be of any configuration, but in a preferred embodiment, the guard is substantially cylindrical and is designed to fit between two adapter or end pieces 18 and 20. The guard is sealed on the ends by overlapping the guard with the end pieces 18 and 20, if only slightly, and by inserting a gasket 22 between the guard 10 and the end pieces. Gasket 22 is a reusable rubber gasket material that may be attached to either the adapter piece or the inside of the end of guard 10. Gasket 22 seals the ends of guard 10 so as to prevent oil leakage through the ends.

Also shown in FIG. 1 is closure element 24 for joining shell portions 12 and 14. As included in the present invention, closure element 24 consists of a retainer element, a retained element, and a resilient gasket. FIG. 2 illustrates in more detail the preferred embodiment of closure element 24 as shown in FIG. 1. As shown, closure element 24 comprises a hook or J-shaped channel 26 extending radially outward from shell portion 14 which channel 26 acts as the retainer element in closure 24. A bent flange 28 extending radially outward from shell portion 12 serves as the retained element. The channel 26 and the flange 28 are dimensioned such that flange 28 is held within channel 26. Flange 28 is bent so that the tip of flange 28 is retained by a lip portion 30 on channel 26. The interference between the end of flange 28 and lip portion 30 keeps the shell portions 12 and 14 wholly engaged. Assisting in this engagement is gasket 32 which is placed between the channel 26 and flange 28. Gasket 32 is preferably a reusable rubber gasket material that is resilient and is adapted to bias the flange 28 into engagement with channel 26. Gasket 32 also serves to seal the closure 24 from oil leaking from the interior of the guard 10 through closure 24. Therefore, it is preferable that gasket 32 would normally be positioned between the portions of channel 26 and flange 28 immediately extending from shell portions 12 and 14. In the embodiment shown in FIG. 2, gasket 32 is between shell portions 12 and 14 to effectively seal off the joint. It is further desirable that gasket 32 run substantially the full length of closure 24 in order to provide a leakproof seal for the full length of the closure.

As shown in FIG. 1, lip portion 30 on channel 26 may be notched at several points along its length to aid in assembly and disassembly. Notches 34 are shown in FIG. 1. To assemble the guard 10, first the opposite side is engaged, and then, starting at one end, flange 28 is forced into engagement with channel 26. A pair of pliers may be used to snap the closure elements into place. The notches 34 provide the necessary access points at which to apply pressure, and the resiliency of gasket 32 allows the shell portions 12 and 14 to be engaged without causing permanent deformation to the shell portions. In assembly, pressure is applied on the tip of flange 28 at notches 34 causing flange 28 to compress gasket 32 and flange 28 is brought within channel 26. The resiliency of gasket 32 causes flange 28 to contact the lip 30 on channel 26 thus holding the cylindrical portions 12 and 14 in engagement. Gasket 22, positioned between the end pieces 18 and 20 and the guard 10, also biases the shell portions 12 and 14 radially outward from the center of the guard which increases the force engaging flange 28 with the lip 30 on channel 26.

To disassemble guard 10, a screwdriver or other flat object may be inserted into a notch 34 near one end of the guard and the screwdriver simply twisted. As this is repeated at each notch, the closure element will unsnap. Again, the resiliency of the gasket 32 allows for this simple disassembly.

The guard 10, and particularly the shell portions 12 and 14 may be made of steel, plastic, aluminum or any other material that exhibits the necessary strength, heat resistance, and spark resistance required by coupling guard specifications as known in the art. Steel is probably the preferred material because of its strength, formability and cost advantages, although aluminum also may be used. A plastic guard may require the addition of ribs or gussets to provide additional strength.

The closure elements may be formed as an integral part of the shell portions or they may be attached by welding, rivets, bolts or other means. The simplicity of the configuration of the elements allows the elements to be easily formed, fabricated or machined in steel or plastic. As an example of alternative embodiments, the shell portions 12 and 14 may be aluminum with steel flanges 26 and 28 attached to the aluminum by pop rivets.

The gaskets 22 and 32 may be of any resilient material that can provide a substantially oil leakproof seal. The preferred material is an elastic rubber material, and the most preferred material is a foamed rubber. The end gaskets 22 may also be in the form of an O-ring. The gasket material may have an adhesive backing or be adhered with an adhesive to either the retainer or retained element, but preferably an adhesive 33 is used to attach gasket 32 to the retainer element channel 26 as shown in FIG. 2.

The guard 10 is designed to withstand the forces exerted on it by a rotating shaft or coupling within the guard. It is also designed to withstand the use of lubricants on the coupling. FIG. 3 further shows the provision of lines 36 and 38 for draining excess oil from the coupling, and vent pipe 40 for venting hot gases. It is conceivable that an inlet port may also be added to the configuration for introducing lubricants or other materials to the interior of the guard.

FIGS. 4, 5, and 6 show alternative configurations and placements for the closure elements 24 of the present invention. It is desirable to have two closures 24 included within guard 10, but the invention is not limited to having two. The guard 10 may have only one closure 24 as described by the present invention and may have a hinge or some other flexible connection that would allow removal of the guard to service the coupling, or it may comprise only one closure element with a split cylindrical guard that is flexible and is capable of being opened. The guard 10 may also comprise more than two semi-cylindrical shell portions and closures 24 included in its design, although two shell portions are preferred. FIG. 4 shows a configuration with two shell portions wherein the closures 24 are about 180° apart and the flange portions of the closures are on the same shell portion and both channels are on the other shell portion. FIG. 5 shows a configuration in which both shell portion are identical with one being rotated 180° with respect to the other, i.e., one shell portion provides the flange and the other provides the channel component for each closure. This configuration may have some manufacturing advantages over the other configurations. FIG. 6 shows a configuration in which the closures are less than 180° apart and the flanges and channels are on separate pieces. Such configuration may have advantages in assembly as the flanges are closer together than the other embodiments. FIG. 7 shows an embodiment of the invention having three semi-cylindrical shell portions 41, 43, and 45 and three closure elements 24.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention, therefore, is intended to encompass such rearrangements, modifications and substitutions of parts and elements as fall within the scope of the present invention.

I claim:

1. A coupling guard comprising:
   a plurality of shell portions that are capable of being joined together to form an enclosure about a coupling,
   at least two of said shell portions being joined by a closure comprising a retainer element, a retained element, and a resilient gasket positioned between said retainer element and said retained element, the gasket running substantially the length of said closure and said gasket being adapted and positioned to substantially seal the guard and resiliently bias the retained element into retaining engagement with the retainer element, and
   the retainer element being formed by an extension from one of said shell portions joined by said closure and the retained element being formed by a flange on the other shell portion joined by said closure.

2. The coupling guard of claim 1, wherein the retainer element is a hook-shaped channel.

3. The coupling guard of claim 2, wherein the retained element is a flange that fits within said channel.

4. The coupling guard of claim 1, wherein the gasket is foamed rubber material.

5. The coupling guard of claim 1, wherein the gasket is affixed by an adhesive to the retainer element.

6. The coupling guard of claim 1, further comprising end pieces connected to either end of said shell portions and the connection of said end pieces being sealed with a rubber gasket.

7. The coupling guard of claim 1, wherein the retainer element is notched to aid in the assembly and disassembly of the coupling guard.

8. The coupling guard of claim 1, wherein said guard inches at least two of said closures.

9. A coupling guard for enclosing rotating couplings and shafts, said guard comprising:
   at least two semi-cylindrical shell portions that cooperate to form a substantially cylindrical enclosure, the shell portions being joined in at least one location by a closure that runs substantially the length of said guard, said closure comprising a retainer element, a retained element and a resilient gasket substantially intermediate the retainer element and the retained element, said gasket adapted to both seal the guard along such closure and to resiliently bias the retained element into retaining engagement with the retainer element, and
   the retainer element being formed by a hook-shaped channel extending from one of said shell portions joined by said closure and the retained element being formed by a flange extending from said other shell portion joined by said closure.

10. The coupling guard of claim 9, wherein the gasket renders the closure substantially leakproof along its length.

11. The coupling guard of claim 9, wherein the retainer element includes notches along its length to aid in assembly and disassembly of the coupling guard.

12. The coupling guard of claim 9, wherein each semi-cylindrical shell portion has a retainer element formed along one edge and a retained element formed along a second edge.

13. The coupling guard of claim 9, wherein the semi-cylindrical shell portions are substantially identical.

14. The coupling guard of claim 9, wherein the guard includes two closures that are located about 180 degrees apart.

15. The coupling guard of claim 9, wherein the guard includes two closures that are located less than 180 degrees apart.

* * * * *